(12) United States Patent
Bialetzki

(10) Patent No.: US 12,179,715 B2
(45) Date of Patent: Dec. 31, 2024

(54) CLEANING UNIT

(71) Applicant: Bayerische Motoren Werke Aktiengesellschaft, Munich (DE)

(72) Inventor: Tobias Bialetzki, Pleinfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 272 days.

(21) Appl. No.: 17/292,931

(22) PCT Filed: Nov. 13, 2019

(86) PCT No.: PCT/EP2019/081197
§ 371 (c)(1),
(2) Date: May 11, 2021

(87) PCT Pub. No.: WO2020/109000
PCT Pub. Date: Jun. 4, 2020

(65) Prior Publication Data
US 2022/0001841 A1    Jan. 6, 2022

(30) Foreign Application Priority Data
Nov. 28, 2018   (DE) .................. 10 2018 130 159.6

(51) Int. Cl.
*B60S 1/48*       (2006.01)
*B08B 3/02*       (2006.01)
(Continued)

(52) U.S. Cl.
CPC ............. *B60S 1/481* (2013.01); *B08B 3/02* (2013.01); *B60S 1/50* (2013.01); *B60S 1/52* (2013.01);
(Continued)

(58) Field of Classification Search
None
See application file for complete search history.

(56) References Cited

U.S. PATENT DOCUMENTS 2,293,684 A * 8/1942 Holthouse ............ F04B 53/127
                                                 417/418
2,495,598 A * 1/1950 Parker .................. F04B 17/046
                                                  310/34
(Continued)

FOREIGN PATENT DOCUMENTS

CN         106232437 A       12/2016
CN         106427895 A        2/2017
(Continued)

OTHER PUBLICATIONS

International Search Report (PCT/ISA/210) issued in PCT Application No. PCT/EP2019/081197 dated Feb. 5, 2020 with English translation (six (6) pages).
(Continued)

*Primary Examiner* — Spencer E. Bell
*Assistant Examiner* — Omair Chaudhri
(74) *Attorney, Agent, or Firm* — Crowell & Moring LLP

(57) ABSTRACT

A cleaning unit for a window or a sensor in a motor vehicle includes a reservoir for a cleaning liquid, at least one cleaning nozzle provided in or on a cleaning nozzle unit, a fluid connection between the reservoir and the cleaning nozzle and at least one spray pump provided between the reservoir and the cleaning nozzle. The spray pump is formed by a piston-cylinder unit that has a cylinder axis and is provided in or on the cleaning nozzle unit. The cleaning unit is characterized in that the piston of the piston-cylinder unit is designed as an electromagnetically actuated piston, which can be actuated in a first direction under the action of an electromagnetic force directed along the cylinder axis, which first direction forms a compression direction.

7 Claims, 2 Drawing Sheets

(51) Int. Cl.
  *B60S 1/50* (2006.01)
  *B60S 1/52* (2006.01)
  *F04B 17/04* (2006.01)
  *F04B 19/04* (2006.01)
  *F04B 23/02* (2006.01)
  *F04B 53/12* (2006.01)
  *F04B 53/14* (2006.01)

(52) U.S. Cl.
  CPC ............ *F04B 17/044* (2013.01); *F04B 19/04* (2013.01); *F04B 23/02* (2013.01); *F04B 53/12* (2013.01); *F04B 53/14* (2013.01); *B08B 2203/027* (2013.01)

(56) References Cited

U.S. PATENT DOCUMENTS

| | | | | |
|---|---|---|---|---|
| 3,181,194 | A * | 5/1965 | Daykin | B60S 1/482 15/250.02 |
| 5,073,095 | A * | 12/1991 | Thomas, Sr. | F04B 17/046 335/257 |
| 5,509,792 | A * | 4/1996 | Sullivan | F04B 17/048 92/162 P |
| 6,754,912 | B1 * | 6/2004 | Hayashi | E03D 9/08 239/468 |
| 2004/0022651 | A1 * | 2/2004 | Hashimoto | F04B 17/046 417/417 |
| 2005/0019181 | A1 | 1/2005 | Wang | |
| 2005/0051142 | A1 * | 3/2005 | Zdravkovic | F16K 31/0665 251/129.1 |
| 2008/0044301 | A1 * | 2/2008 | Ohnishi | F04B 17/046 417/417 |
| 2011/0061160 | A1 * | 3/2011 | Mochita | E03D 9/08 4/615 |
| 2012/0161049 | A1 * | 6/2012 | Alvarez | F16K 31/0679 29/890.12 |
| 2012/0251359 | A1 * | 10/2012 | Neelakantan | F04B 11/0058 417/416 |
| 2015/0343999 | A1 | 12/2015 | Lopez Galera et al. | |
| 2017/0168291 | A1 * | 6/2017 | Buss | G02B 27/0006 |
| 2017/0313286 | A1 * | 11/2017 | Galera | B08B 3/02 |
| 2019/0126891 | A1 * | 5/2019 | Kondo | B60S 1/56 |
| 2019/0359178 | A1 * | 11/2019 | Hornby | F16K 27/003 |
| 2020/0001832 | A1 * | 1/2020 | Deane | B08B 3/02 |
| 2020/0254980 | A1 * | 8/2020 | Kondo | F04B 9/047 |
| 2021/0001678 | A1 * | 1/2021 | Koyama | B60S 1/54 |
| 2021/0001811 | A1 * | 1/2021 | Cosby | B60S 1/02 |
| 2021/0245718 | A1 * | 8/2021 | Hahn | B60S 1/56 |
| 2022/0332289 | A1 * | 10/2022 | Alcaide Hernández | F16K 31/0658 |

FOREIGN PATENT DOCUMENTS

| | | | | |
|---|---|---|---|---|
| DE | 3840621 | A1 * | 6/1990 | |
| DE | 41 05 379 | A1 | 8/1992 | |
| DE | 196 53 432 | A1 | 6/1997 | |
| DE | 198 00 013 | A1 | 7/1999 | |
| DE | 199 16 947 | A1 | 10/2000 | |
| DE | 100 59 216 | A1 | 6/2002 | |
| DE | 102013201756 | A1 * | 8/2014 | .......... F01L 13/0005 |
| DE | 10 2014 115 670 | A1 | 12/2015 | |
| DE | 10 2017 201 756 | A1 | 8/2018 | |
| EP | 2 955 069 | A1 | 12/2015 | |
| FR | 1 460 494 | A | 10/1966 | |
| FR | 2 343 139 | A1 | 9/1977 | |
| GB | 258139 | A | 9/1926 | |
| GB | 430366 | A | 6/1935 | |
| GB | 1576098 | A * | 10/1980 | ............... B60S 1/48 |
| KR | 20120092823 | A * | 8/2012 | |
| WO | WO 2014/117763 | A1 | 8/2014 | |
| WO | WO 2018/187089 | A1 | 10/2018 | |

OTHER PUBLICATIONS

German-language Written Opinion (PCT/ISA/237) issued in PCT Application No. PCT/EP2019/081197 dated Feb. 5, 2020 (five (5) pages).

German-language Search Report issued in German Application No. 10 2018 130 159.6 dated Oct. 30, 2019 with partial English translation (14 pages).

English-language Chinese Office Action issued in Chinese application No. 201980076374.2 dated May 18, 2023 (Six (6) pages).

English-language Chinese Office Action issued in Chinese Application No. 201980076374.2 dated Nov. 7, 2023 (6 pages).

* cited by examiner

A

B

C

CLEANING UNIT

TECHNICAL FIELD

The invention relates to a cleaning unit, in particular for a window or a sensor in a motor vehicle. The invention also relates to a motor vehicle having such a cleaning unit.

BACKGROUND AND SUMMARY OF THE INVENTION

According to the prior art, sensor cleaning in automobiles is realized by a classical washing-water system. Here, a cleaning nozzle is subjected to pressure via a washing-water line by means of a pump. As soon as the opening pressure of a provided check valve at the nozzle is exceeded, the check valve opens and the cleaning fluid sprays onto the sensor. After the pump is switched off, the pressure drops below the opening pressure of the check valve again and the nozzle closes, whereby the spraying process is at an end.

DE 196 53 432 A1 has disclosed a window-washing device which has a plurality of window-washing nozzles, wherein each nozzle is provided with a solenoid valve which, when an electrical pulse is applied, opens the nozzle exit. A central pump supplies the nozzles with pressurized washing liquid via a hose line, and the respective nozzle openings are opened and closed by means of the solenoid valve assigned thereto in a manner dependent on the position of the windshield wiper.

DE 10 2014 115 670 A1 has disclosed a cleaning device for a reversing camera of a motor vehicle, in which there is arranged beside the camera optical unit a spray nozzle for a cleaning liquid, which spray nozzle is directed toward the camera optical unit. The spray nozzle is connected via a line to a piston pump having a piston which is movable axially in a cylinder counter to the force of a spring and which is driven via a piston rod by an external actuator. With this actuator-actuated piston rod drive, only a gradual buildup of pressure in the compression space of the piston pump is possible, the result of which is only gradual responsiveness of the piston pump.

The elasticity of hose lines and the inertia of the liquid volume in the lines, especially for large line lengths, result in a delayed buildup of pressure at the cleaning nozzle. For this reason, after the runup of the washing-water pump, the desired operating point of the cleaning nozzle is attained only with a certain delay. However, since the cleaning processes for sensors—unlike conventional window-cleaning or headlight-cleaning—generally work with very short spraying times (for example <1.0 sec.), a relatively quick buildup of pressure and reduction of pressure are expedient for high efficiency of the cleaning nozzle. Immediate presence of the operating point pressure at the cleaning nozzle would be ideal here. This is the only way to ensure that a constantly high pressure is provided over the entire spraying process.

It is an object of the present invention to design a generic cleaning device in such a way that it has quicker responsiveness in comparison with the prior art.

This object is achieved by way of the features of the independent claim.

In the case of a cleaning unit, in particular for a window or a sensor in a motor vehicle, which is provided with a reservoir for a cleaning liquid, at least one cleaning nozzle, a fluid connection between the reservoir and the cleaning nozzle, and at least one spray pump which is provided between the reservoir and the cleaning nozzle, wherein the cleaning nozzle is provided in or on a cleaning nozzle unit, and wherein the spray pump is formed by a piston-cylinder unit with a cylinder axis that is provided in or on the cleaning nozzle unit, it is provided according to the invention that the piston of the piston-cylinder unit is in the form of an electromagnetically actuated piston which is actuatable in a first direction, forming a compression direction, under the action of an electromagnetic force directed along the cylinder axis.

In order to make possible exact activation of the respective cleaning nozzle unit and to achieve, even for short spraying cycles, an immediate buildup of pressure, the actuator, that is to say the spray pump, is, according to the invention, arranged in or on the cleaning nozzle unit, preferably directly before the cleaning nozzle, or more preferably even integrated into the cleaning nozzle. In this way, cleaning liquid lines between the spray pump and the cleaning nozzle, which are a hindrance to building up pressure quickly in the prior art, are avoided. As a result of this provision of the spray pump in or on the respective cleaning nozzle unit, in the case of the subject matter according to the invention, the inertia and elasticity in the system brought about by hose lines in the prior art are consequently reduced to a minimum since, as a result of the piston of the piston-cylinder unit, which forms the respective spray pump, only the fluid situated in the pressure chamber has to be accelerated. In this way, a relatively quick buildup of pressure is realized at the place of action, that is to say in the cleaning nozzle. The result is consequently an exactly defined amount, predetermined by the volume of the pressure chamber, of cleaning fluid per spray burst. The provision of the piston as a movable element of an electromagnetic linear drive ensures very quick responsiveness of the spray pump.

Further preferred and advantageous design features of the cleaning unit according to the invention are the subject of the dependent claims.

Preferably, the piston of the piston-cylinder unit consists of or at least has a magnetic material. In this way, the efficiency of the electromagnetic drive is improved such that the responsiveness of the spray pump formed thereby becomes even quicker.

Also particularly advantageous is an embodiment in which the piston-cylinder unit has an electromagnetic excitation apparatus which is designed to move the piston along the cylinder axis upon application of an electrical voltage. This allows a particularly compact design of the spray pump to be obtained.

Preferably, the electromagnetic excitation apparatus surrounds a cylinder section of the piston-cylinder unit and has here at least two electrical coils, which are arranged one behind the other in the direction of the cylinder axis. This embodiment, too, allows a particularly compact construction of a highly effective linear drive for the piston. In the form of a linear drive, a magnetic field which travels from one coil to the next coil along the cylinder axis and, in the process, carries along the piston can be generated here. Such a linear drive can accelerate the piston in a particularly abrupt manner, with the result that the buildup of pressure in the spray pump is realized almost instantaneously.

It is also advantageous for provision to be made of a restoring spring which acts on the piston with a restoring force counter to the compression direction. Such a restoring spring makes it possible for the piston to be reset into its initial position in a quick, automatic manner and for new cleaning liquid to be sucked into the pump space or pressure space of the piston-cylinder unit in a highly effective manner.

It is also particularly advantageous for there to be provided a first check valve in the piston of the piston-cylinder unit. In this way, quick filling of the pump space of the piston-cylinder unit is made possible.

Preferably, a second check valve is provided between the piston-cylinder unit, which forms the spray pump, and the cleaning nozzle. As a result, with the second check valve closed, sucking-in of air during the return movement of the piston through the cleaning nozzle is prevented. In this way, it is achieved that a suction force which brings about quick refilling of the pump space can be built up highly effectively by the restoring spring during the return movement of the piston into its initial position.

In all embodiments, it is particularly advantageous for there to be provided a delivery pump between the reservoir and the piston-cylinder unit, which forms the spray pump. Such a delivery pump results not only in continual replenishment of cleaning liquid into the system, but also in the possibility of a buildup of a slight positive pressure in the line system leading to the respective cleaning nozzle units, which slight positive pressure promotes quick refilling of the respective pump space.

Preferably, provision is made of a plurality of cleaning nozzle units which are each connected to a common fluid line, which forms the fluid connection between the reservoir and the respective cleaning nozzle and is in the form of a ring line and runs from the reservoir via the cleaning nozzle units back to the reservoir, and the delivery pump is arranged in the ring line, preferably in or on the reservoir. Here, the delivery pump is arranged in an effective manner in the ring line between the cleaning fluid volume in the reservoir and the first cleaning nozzle unit as seen in the flow direction of the cleaning liquid. The common fluid line may however also be in the form of a branch line.

Between the reservoir and the respective spray pump, it is possible to provide a check valve before each spray pump, that is to say before each piston-cylinder unit, which check valve ensures that cleaning liquid is at all times present on the suction side of the respective spray pump.

The invention is also directed at a motor vehicle having at least one cleaning unit according to the invention.

Preferred exemplary embodiments of the invention along with additional configuration details and further advantages are described and discussed in more detail below with reference to the appended drawing.

DETAILED DESCRIPTION OF THE DRAWINGS

Figure 1:
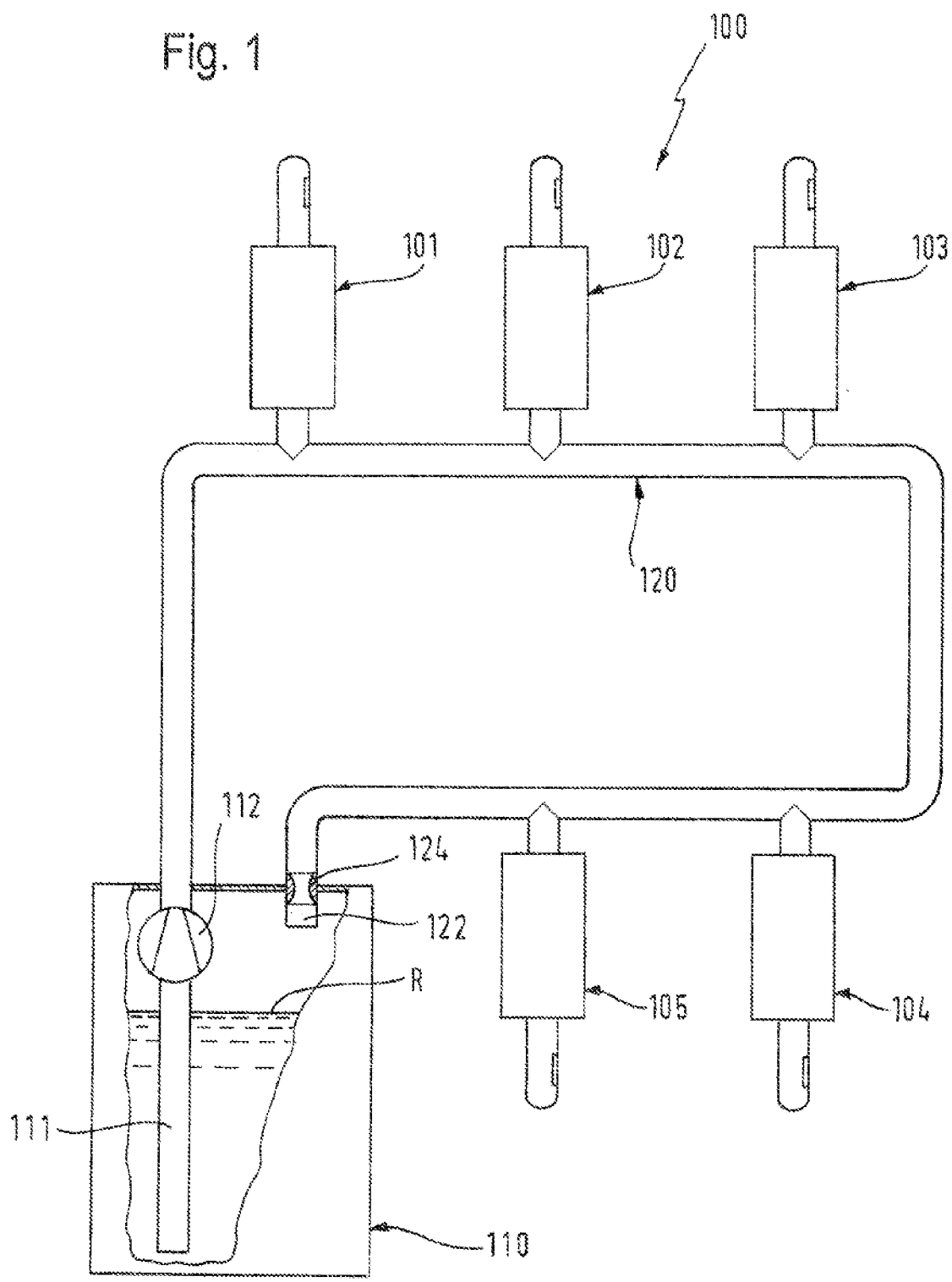
FIG. 1 shows a cleaning unit with a plurality of cleaning nozzle units which are designed according to an embodiment of the invention.

FIG. 1 illustrates a cleaning unit to be used in a motor vehicle for cleaning windows or sensors. This cleaning unit 100 has a reservoir 110 for a cleaning liquid, in which reservoir a delivery pump 112 is provided. The delivery pump 112 has a suction connector 111 which is submerged in a volume of a cleaning liquid R. A ring line 120 is connected to the pressure side of the delivery pump 112 and, at its other end 122, opens into the reservoir 110 again. In its region of the end 122 opening into the reservoir 110, the ring line may be provided with a throttle 124, which forms a flow resistance which makes it possible for the delivery pump 112 to build up a slight positive pressure in the interior of the ring line 120.

Multiple cleaning nozzle units 101, 102, 103, 104, 105 are connected to the ring line 120. These cleaning nozzle units 101, 102, 103, 104, 105 are of substantially structurally identical form and will be described in more detail below on the basis of FIGS. 2 and 3. The ring line 120 may be a pipe, but it may also consist of, or at least have, a flexible hose.

The individual cleaning nozzle units 101, 102, 103, 104, 105 are supplied with cleaning liquid R via the ring line 120. Since a slight positive pressure prevails in the ring line 120, the ring line 120 is at all times filled with cleaning liquid R, the cleaning liquid also being present at the fluid inlets of the respective cleaning nozzle unit 101, 102, 103, 104, 105 due to the slight positive pressure.

Figure 2:
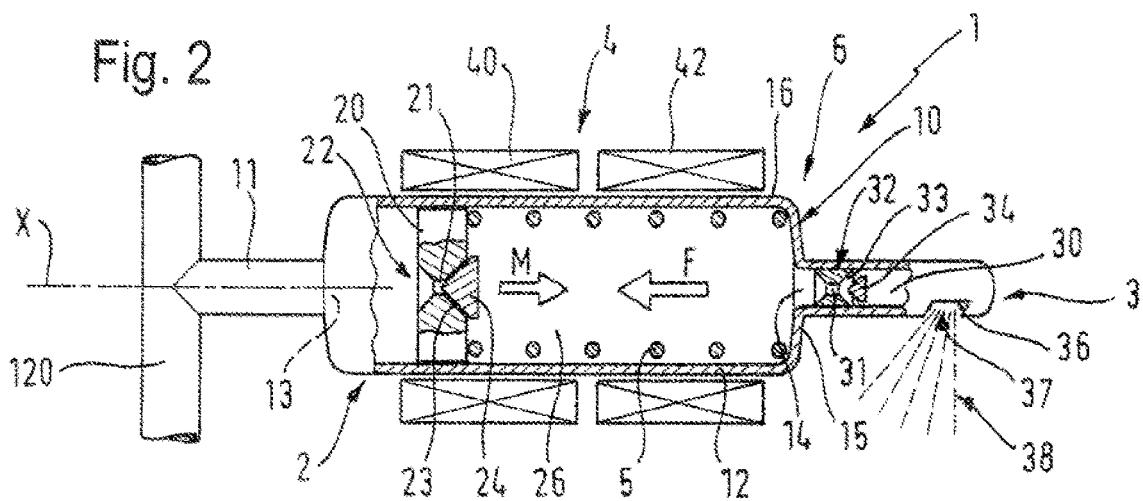
FIG. 2 shows a partially sectioned illustration of a cleaning nozzle unit according to the invention.

FIG. 2 shows a cleaning nozzle unit 1 which is designed according to the present invention and which corresponds to the cleaning units 101, 102, 103, 104, 105 illustrated schematically in FIG. 1.

The cleaning nozzle unit 1 has a housing 10 with a cylinder section 12 which forms the cylinder of a piston-cylinder unit 2. The cylinder section 12 is closed at its two axial ends with the exception of, in each case, one flow opening (flow inlet 13 or flow outlet 14). The flow inlet 13 opens into a fluid connection 11 which is or can be connected to the ring line 120, and the flow outlet 14 opens into an inner fluid channel 30 of a cleaning nozzle 3 which is connected in an effective manner in terms of flow, preferably integrally, to the housing 10 of the cleaning nozzle unit 1.

A piston 20 is arranged in the cylinder section 12 of the housing 10 of the cleaning nozzle unit 1 so as to be axially displaceable along the cylinder axis X. This piston 20 consists of or has a magnetic material. The piston 20, a nozzle-side face wall 15 of the housing 10 and the circumferential wall 16 of the cylinder section 12 bound a pump space or pressure space 26 of the piston-cylinder unit 2.

An electromagnetic excitation apparatus 4 surrounds the cylinder section 12 of the housing 10 of the cleaning nozzle unit 1. Here, this electromagnetic excitation apparatus 4 is represented by way of example by two schematically illustrated electrical coils 40, 42, which are arranged one behind the other in the direction of the cylinder axis X and are formed for passage of an electrical current, wherein it is also possible for more than two coils to be provided.

If the coils 40, 42 are excited through application of an electrical voltage, then they generate an electromagnetic field which moves the magnetic piston 20 along the cylinder axis X in the direction of the cleaning nozzle 3 (to the right in FIG. 2). A helical spring in the form of a compression spring 5 is provided in the interior of the cylinder section 12 of the housing 10 of the cleaning nozzle unit 1 and extends, likewise in the direction of the cylinder axis X, between the piston 20 and the nozzle-side face wall 15 of the housing 10 and is supported both against the piston 20 and against the nozzle-side face wall 15. Owing to its spring force F, the compression spring 5 acts to force the piston 20 away from the nozzle-side face wall 15 (to the left in FIG. 2). The magnetic force M induced by the excitation of the coils 40, 42, for its part, acts to force the piston 20 toward the nozzle-side face wall 15 and thus acts counter to the force F of the compression spring 5.

In the piston 20, there is formed a first check valve 22, the flow channel 21 of which extends through the piston 20 in the axial direction. A valve body 24 is provided on that side of the piston 20 facing toward the nozzle-side face wall 15 and interacts sealingly with a valve seat 23 in the region of the opening of the flow channel 21 there.

A second check valve 32 is provided in the fluid channel 30 of the cleaning nozzle 3 and has a flow channel 31 and a valve body 34, the latter being arranged on the side facing away from the pressure space 26 and interacting sealingly with a valve seat 33 in the region of the opening of the flow channel 31 there.

The piston-cylinder unit 2 forms, with the two check valves 22, 32 and the electromagnetic excitation apparatus 4 for the piston 20, a highly agile spray pump 6.

The cleaning nozzle 3 has at that end of the fluid channel 30 facing away from the piston-cylinder unit 2 a nozzle opening 36 from which a spray jet 38 can exit, as is illustrated symbolically in FIG. 2.

FIG. 2 shows the initial or rest position of the piston 20 of the piston-cylinder unit 2. The pressure space 26 of the piston-cylinder unit 2 is formed between the piston 20 and the nozzle-side face wall 15 of the cylinder section 12. On that side of the piston 20 facing away from the pressure space 26 (to the left of the piston 20 in FIG. 2), cleaning liquid is present at the slight positive pressure generated by the delivery pump 112 in combination with the throttle 124. This slight positive pressure is not sufficient, however, to open the check valve 22 in the piston 20.

The functioning of the cleaning nozzle unit 1 shown in FIG. 2 will be described below on the basis of FIGS. 3A to 3C.

Figure 3:
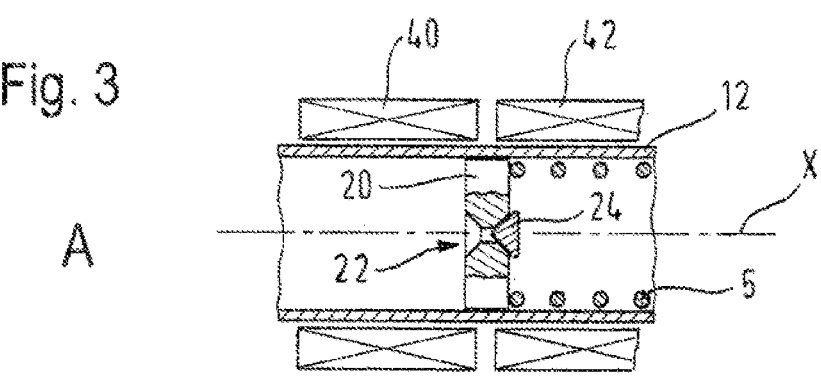
FIGS. 3A to C show different phases of a spraying process by way of the cleaning nozzle unit as per FIG. 2.
Figure 3:
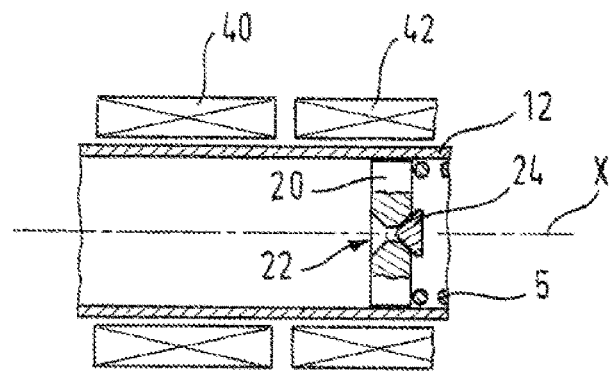
Figure 3:
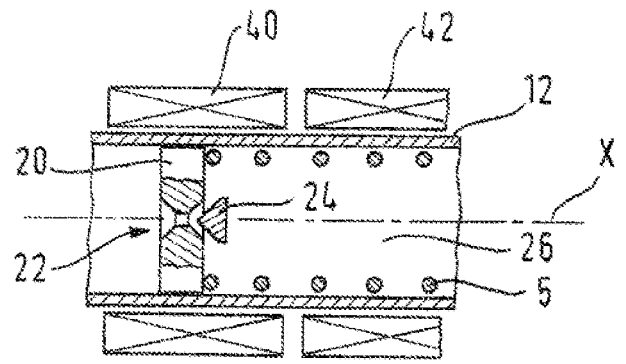

If an electrical voltage is now applied to the electrical coils 40, 42, so that a current flows in them, there is formed a magnetic field which acts to move the magnetic piston 20 in the direction of the nozzle-side face wall 15 of the cylinder section 12 by way of the magnetic force M counter to the spring force F of the compression spring 5. Here, the magnetic force M is significantly larger than the spring force F, with the result that the piston 20 is moved abruptly to the right in FIGS. 2 and 3, with the compression spring 5 being compressed, and the volume of the pressure space 26 is compressed. FIGS. 3A and 3B show two phases of this movement.

The cleaning liquid contained in the pressure space 26 pushes the valve body 24 of the first check valve 22 provided in the piston 20 against the associated valve seat 21, with the result that the first check valve 22 is in a closed state and the liquid in the pressure space 26 is pressurized by the piston 20 moving to the right. In the second check valve 32, as a result of this pressure increase in the interior of the pressure space 26, the valve body 34 is moved out of its valve seat 33, with the result that the cleaning liquid can enter the fluid channel 30 of the cleaning nozzle 3 from the compression space 26 through the flow channel 31 and can exit through the nozzle opening 36 in the form of a spray jet 38.

FIG. 3B shows the piston 20 in its furthest right position, that is to say at the top dead center. If the piston 20 has reached the position shown in FIG. 3B, then the electrical voltage present at the coils 40, 42 is switched off and the magnetic field collapses, whereupon the magnetic force M also no longer acts. The spring force F of the compression spring 5 can therefore, as is illustrated in FIG. 3C, slowly move the piston 20 back into its initial position (to the left in FIGS. 2 and 3). At the same time, the second check valve 32 is closed and, owing to the slight positive pressure present in the ring line 120 and to the dynamic pressure formed in the flow channel 21 of the first check valve 22 as a result of the return movement of the piston 20, the valve body 24 of the first check valve 22 provided in the piston is detached from its valve seat 23 and moves out of its closed position, as is illustrated schematically in FIG. 3C, with the result that the cleaning liquid can flow into the pressure space 26 from the ring line 120 through the flow channel 21. Consequently, the slight positive pressure from the ring line 120 is also present in the pressure space 26. This slight positive pressure is not sufficient, however, to open the second check valve 32 in the cleaning nozzle 3, and so this valve still remains closed and no follow-up flow of cleaning fluid and exit thereof through the cleaning nozzle 3 is possible.

Thus, in the case of the cleaning unit 100, instead of a classical central washing-water pump with rotary action, provision is made, in a decentralized manner, of a piston-cylinder spray pump assigned to the respective cleaning nozzle unit 1, 101, 102, 103, 104, 105 and having an electromagnetically actuated piston 20 with translational action, and this spray pump 6 is arranged in or on the respective cleaning nozzle unit 1, 101, 102, 103, 104, 105, that is to say in close spatial proximity to the cleaning nozzle 3. As soon as current is applied to the coils 40, 42 of the electromagnetic excitation apparatus 4, the magnetic field consequently formed pulls the piston 20 counter to the restoring spring 5 in the direction of the cleaning nozzle 3. The positive pressure formed in this way in the pressure chamber 26 of the piston-cylinder unit 2 opens the second check valve 32, situated before the nozzle exit 37 at the nozzle opening 36, in an abrupt manner and the spraying process begins immediately and without any significant delay and virtually at maximum pressure.

If the pressure chamber 26 has been emptied, the coils 40, 42 are switched into the deenergized state and the compression spring 5, acting as a restoring spring, moves the piston 20 back into its initial or rest position (FIG. 2). During this return movement, the pressure chamber 26 is filled via the first check valve 22, which can be passed through on one side, with cleaning liquid again ("reloading phase"). As soon as the piston 20 has reached its rest position, the next spray burst can be performed.

The supply of the individual cleaning nozzle units 101, 102, 103, 104, 105 with cleaning liquid during the reloading phase can be realized in the whole vehicle via the same ring line 120 or branch line. The delivery pump or circulation pump, with very low power, serves for deaerating the hose line. Furthermore, it makes available the cleaning liquid required after the realized spraying process for the reloading phase at the inflow connection of each cleaning nozzle unit 101, 102, 103, 104, 105. The larger the number of sensors to be cleaned in the vehicle, the more expedient the construction of a ring line system, as is illustrated by way of example in FIG. 1, is.

The cleaning process can be controlled for example by variation of the voltage applied to the coils 40, 42 and/or by variation of the duration of the applied voltage. The magnitude of the voltage applied to the coils 40, 42 influences the force exerted on the piston 20 and thus the magnitude of the pressure by which the cleaning fluid R is expelled. The higher the applied voltage, the larger the force exerted on the piston 20 is. The duration of the movement of the piston 20 can be influenced by varying the duration over which the voltage is applied to the coils 40, 42. Consequently, the duration of the applied voltage controls the travel covered by the piston 20 and thus the amount of cleaning fluid R expelled.

The invention is not limited to the above exemplary embodiment, which serves merely for the general explanation of the core concept of the invention. Within the scope of protection, the apparatus according to the invention may rather also assume embodiments other than those described above. Here, the apparatus may in particular have features which constitute a combination of the respective individual features of the claims.

Reference signs in the claims, in the description and in the drawings serve merely for better understanding of the invention and are not intended to limit the scope of protection.

LIST OF REFERENCE SIGNS

1 Cleaning nozzle unit
2 Piston-cylinder unit
3 Cleaning nozzle
4 Electromagnetic excitation apparatus
5 Compression spring
6 Spray pump
10 Housing
11 Fluid connection
12 Cylinder section
13 Flow inlet
14 Flow outlet
15 Nozzle-side face wall
16 Circumferential wall
20 Piston
21 Flow channel
22 First check valve
23 Valve seat
24 Valve body
26 Pressure space
30 Fluid channel
31 Flow channel
32 Second check valve
33 Valve seat
34 Valve body
36 Nozzle opening
37 Nozzle exit
38 Spray jet
40 Electrical coil
42 Electrical coil
100 Cleaning unit
101 Cleaning nozzle unit
102 Cleaning nozzle unit
103 Cleaning nozzle unit
104 Cleaning nozzle unit
105 Cleaning nozzle unit
110 Reservoir
111 Suction connector
112 Delivery pump
120 Ring line
122 End of the ring line that opens into the reservoir 110
124 Throttle
F Spring force
M Magnetic force
R Cleaning liquid
X Cylinder axis

What is claimed is:

1. A cleaning unit having a reservoir for a cleaning fluid, comprising:
a cleaning nozzle unit;
a spray pump formed by a piston cylinder unit;
a cleaning nozzle;
wherein the cleaning nozzle unit has a housing, wherein the housing of the cleaning nozzle unit has a cylinder section which forms a cylinder of the piston cylinder unit, wherein the cleaning nozzle is integrally formed with the housing of the cleaning nozzle unit, and wherein there is no cleaning liquid line between the spray pump and the cleaning nozzle; and
a fluid connection between the reservoir and the cleaning nozzle unit;
wherein the piston cylinder unit has cylinder axis and an electromagnetically actuated piston which is disposed in the cylinder section of the housing of the cleaning nozzle unit,
wherein the piston, a nozzle-side face wall of the housing, and a circumferential wall of the cylinder section of the housing bound a pressure chamber of the piston-cylinder unit,
wherein a single compression spring extends between the piston and the nozzle-side face wall of the housing,
wherein the piston is movable in a first direction toward the cleaning nozzle, forming a compression direction, solely under action of electromagnetic force directed along the cylinder axis, wherein the electromagnetic force is counter to a spring force of the single compression spring, wherein the magnetic force is significantly larger than the spring force such that the piston is moved abruptly in the first direction, and wherein a movement of the piston in the first direction toward the cleaning nozzle forms a positive pressure with the cleaning fluid in the pressure chamber of the piston-cylinder unit such that a second check valve provided between the piston-cylinder unit and the cleaning nozzle is opened and a spraying process with the cleaning fluid out of the cleaning nozzle begins,
wherein the piston is movable in a second direction away from the cleaning nozzle under action of the spring force of the single compression spring when the electromagnetic force is deenergized such that the piston is slowly moved in the second direction with a result that the pressure chamber is filled with the cleaning fluid via a first check valve provided in the piston.

2. The cleaning unit according to claim 1, wherein
the piston is made of or has a magnetic material.

3. The cleaning unit according to claim 1, wherein
the piston-cylinder unit has an electromagnetic excitation apparatus which is designed to move the piston along the cylinder axis upon application of an electrical voltage.

4. The cleaning unit according to claim 3, wherein
the electromagnetic excitation apparatus surrounds the cylinder section of the housing of the cleaning nozzle unit and has at least two electrical coils, which are arranged one behind the other in the direction of the cylinder axis.

5. The cleaning unit according to claim 1, further comprising:
a delivery pump provided between the reservoir and the piston-cylinder unit.

6. The cleaning unit according to claim 5, further comprising:
a plurality of cleaning nozzle units each connected to a common fluid line, wherein
the common fluid line is in the form of a ring line and runs from the reservoir, via the plurality of cleaning nozzle units, back to the reservoir, and
the delivery pump is arranged in the ring line between a volume of the cleaning fluid in the reservoir and a first of the plurality of cleaning nozzle units as seen in a flow direction of the cleaning fluid.

7. A motor vehicle comprising at least one cleaning unit according to claim 1.

\* \* \* \* \*